United States Patent [19]

Gertisser

[11] 4,314,817
[45] Feb. 9, 1982

[54] MONOAZO COMPOUNDS HAVING A SUBSTITUTED THIAZOLIUM-5 DIAZO COMPONENT RADICAL AND A SUBSTITUTED 1,4-PHENYLENE COUPLING COMPONENT RADICAL

[75] Inventor: Berthold Gertisser, Münchenstein, Switzerland

[73] Assignee: Sandoz Ltd., Basel, Switzerland

[21] Appl. No.: 177,016

[22] Filed: Aug. 11, 1980

[30] Foreign Application Priority Data

Aug. 16, 1979 [CH] Switzerland .......................... 7518/79

[51] Int. Cl.$^3$ .......................... C09B 29/22; D06P 3/00
[52] U.S. Cl. .......................... 8/539; 8/691; 8/927; 260/158
[58] Field of Search .......................... 8/539, 691, 927; 260/158

[56] References Cited

U.S. PATENT DOCUMENTS

4,062,642 12/1977 Deucker et al. .......................... 8/691
4,111,930  9/1978 Meybeck .......................... 260/158
4,181,499  1/1980 Koller et al. .......................... 8/568

FOREIGN PATENT DOCUMENTS

1379233 1/1975 United Kingdom .
1380104 1/1975 United Kingdom .
2011458 7/1979 United Kingdom .

*Primary Examiner*—A. Lionel Clingman
*Attorney, Agent, or Firm*—Gerald D. Sharkin; Richard E. Vila; Melvyn M. Kassenoff

[57] ABSTRACT

Compounds of the formula

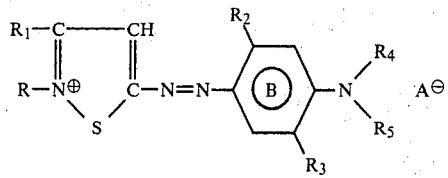

in which
R is $-CH_3$, $-C_2H_5$, $-CH_2CH_2OH$, $-CH_2CH(OH)CH_3$ or $-CH_2CH=CH_2$;
$R_1$ is $-H$ or $-CH_3$;
$R_2$ is $-H$ or $-CH_3$;
$R_3$ is $-OCH_3$ or $-OC_2H_5$;
$R_4$ is $-H$, $-CH_3$, $-C_2H_5$, n- or i- $C_3H_7$, $-CH_2CH_2OH$ or $-CH_2CH=CH_2$;
$R_5$ is $-H$, $-CH_3$, $-C_2H_5$, n- or i- $C_3H_7$ or $R_3$ and $R_5$ together with the N-atom to which $R_5$ is attached and ring B form the group

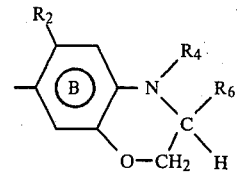

wherein
$R_2$ and $R_4$ are as defined above, and
$R_6$ is $-H$ or $CH_3$; and
$A^\ominus$ is an anion, which are suitable for use as dyes, particularly for dyeing textile substrates comprising or consisting of homopolymers and copolymers of acrylomotrile or asymmetric dicyanoethylene, polyamides modified to contain acid groups and polyesters modified to contain acid groups and for leather, paper and plastics.

12 Claims, No Drawings

MONOAZO COMPOUNDS HAVING A SUBSTITUTED THIAZOLIUM-5 DIAZO COMPONENT RADICAL AND A SUBSTITUTED 1,4-PHENYLENE COUPLING COMPONENT RADICAL

This invention relates to basic azo compounds free from sulphonic acid groups.

More particularly, invention provides azo compounds of the formula I

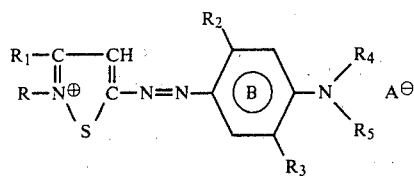

in which
R is $-CH_3$, $-C_2H_5$, $-CH_2CH_2OH$, $-CH_2CH(OH)CH_3$ or $-CH_2CH=CH_2$;
$R_1$ is $-H$ or $-CH_3$;
$R_2$ is $-H$ or $-CH_3$;
$R_3$ is $-OCH_3$ or $-OC_2H_5$;
$R_4$ is $-H$, $-CH_3$, $-C_2H_5$, n- or i- $C_3H_7$, $-CH_2CH_2OH$ or $-CH_2CH=CH_2$;
$R_5$ is $-H$, $-CH_3$, $-C_2H_5$, n- or i- $C_3H_7$ or $R_3$ and $R_5$ together with the N-atom to which $R_5$ is attached and ring B form the group (a)

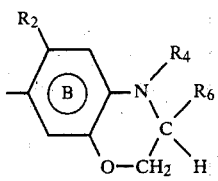

where
$R_2$ and $R_4$ are as defined above, and
$R_6$ is $-H$ or $-CH_3$; and
$A^\ominus$ is an anion.

Preferably R is $R_a$, where $R_a$ is $-CH_3$, $-C_2H_5$ or $-CH_2-CH=CH_2$; more preferably R is $-CH_3$.

Preferably $R_2$ is $-H$.

Preferably $R_4$ is $R_{4a}$, where $R_{4a}$ is $-H$, $-CH_3$, $-C_2H_5$, n-$C_3H_7$, $-CH_2-CH=CH_2$ or $-CH_2CH_2OH$; more preferably $R_4$ is $R_{4b}$, where $R_{4b}$ is $-H$, $-CH_3$ or $-C_2H_5$.

Preferably $R_5$ is $R_{5a}$, where $R_{5a}$ is $-H$, $-CH_3$ or $-C_2H_5$, or $R_3$ and $R_{5a}$ together with the N-atom to which $R_{5a}$ is attached and ring B form the group (a) above. Alternatively, $R_5$ is $R_{5b}$, where $R_{5b}$ is $-H$ or $-CH_3$.

When $R_3$ and $R_5$ together with the N-atom to which $R_5$ is attached and ring B form the group (a), as defined above, then $R_4$ is preferably $R_{4c}$, where $R_{4c}$ is $-CH_3$, $-C_2H_5$, or $-CH_2-CH=CH_2$, the most preferred significance of $R_4$ being $-CH_3$. Preferred compounds according to the invention are of formula II

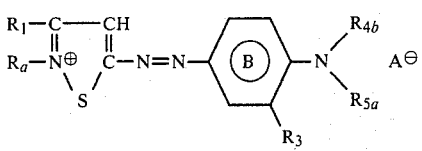

where $R_a$, $R_1$, $R_3$, $R_{4b}$, $R_{5a}$ and $A^\ominus$ are as defined above.

More preferred compounds according to the invention are of formula III

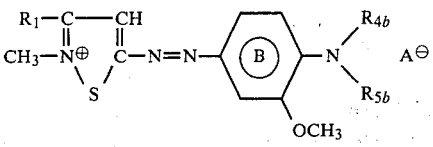

in which $R_1$, $R_{4b}$, $R_{5b}$ and $A^\ominus$ are as defined above.

A further group of preferred compounds according to the invention are of formula IV

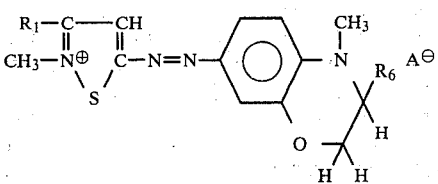

where $R_1$, $R_6$ and $A^\ominus$ are as defined above.

Further according to the invention there is provided a process for the production of a compound of formula I, as defined above, the process comprising quaternising a compound of formula V

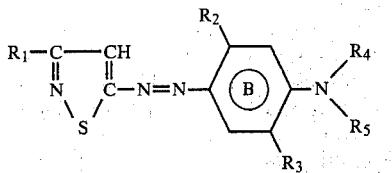

with a compound of formula VI $$R-A \qquad \text{VI}$$

where R, $R_1$, $R_2$, $R_3$, $R_4$ and $R_5$ are as defined above and A is a group capable of forming the anion $A^\ominus$.

Suitable quaternising agents (R—A) are alkyl halides, for example methyl or ethyl chloride, bromide or iodide; and alkyl sulphates, for example dimethyl sulphate. In the abovementioned quaternisation reaction an epoxide, a β-lactone or a vinyl compound in the presence of an acid (H—A) can be used alternatively as a quaternising agent. Specific examples of these alternative quaternising agents are ethylene oxide and propylene oxide.

The above-mentioned quaternisation process may be carried out in an inert solvent or in a suspension in water or, if no inert solvent is used, in the presence of excess quaternising agent, preferably when the medium is buffered and the temperature is elevated.

Compounds of formula V are known or can be made by diazo coupling under known conditions a compound of formula VII

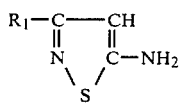

with a coupling component VIII

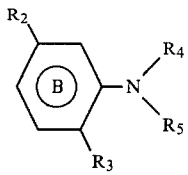

where $R_1$, $R_2$, $R_3$, $R_4$ and $R_5$ are as defined above.

The anion $A^\ominus$ used is any non-chromophoric anion conventional for basic dyestuffs. Examples of the anion $A^\ominus$ used are: halide (such as chloride or bromide), sulphate, bisulphate, methyl sulphate, amino sulphate, perchlorate, benzenesulfonate, oxalate, maleate, acetate, propionate, lactate, succinate, tartrate, malate, methanesulphonate or benzoate. The anion may, alternatively, be a complex such as a chlorozinc double salt. Further suitable anions are those derived from the following acids: boric acid, citric acid, glycollic acid, diglycollic acid, adipic acid or a reaction product of o-boric acid and polyalcohols such as cis polyols. The anion $A^\ominus$ of the quaternised compounds of formula I, as defined above, can be exchanged for another by, for example, ion exchange or by reaction with salt or acid (in more than one step if necessary) by going through a hydroxy or bicarbonate intermediate. Examples of those exchange processes can be found in German Offenlegungsschrift No. 2,001,748 or 2,001,816.

The compounds of formula I are dyestuffs and are useful for the dyeing of cationically dyeable substrates, such as leather, paper and plastics, and particularly for the dyeing or printing of textile substrates containing or consisting of fibres of homopolymers or copolymers of acrylonitrile or asymmetric dicyanoethylene, or of acid-modified polyamides or polyesters. Such polyamides and polyesters are described in Belgian Pat. No. 706,104 and U.S. Pat. No. 3,379,723, respectively.

The compounds may be worked up by conventional means into solid or liquid compositions, for example by granulation or by dissolving in a suitable solvent, optionally in the presence of additives such as stabilisers or solubilising agents such as urea. Such preparations may be obtained for example as described in French Pat. Nos. 1,572,030 and 1,581,900 or German Patent publications Nos. 2,001,748 and 2,001,816.

Polymers may be dyed for example by the continuous gel-dyeing process, for which liquid compositions of the dyes are particularly suitable. Textile material may be dyed in neutral or acidic aqueous media at temperatures of from 60°–100° C. at atmospheric pressure or at temperatures over 100° C. under pressure. Alternatively, dyeing may be carried out in organic solvents, for example as described in German patent publication No. 2,437,549.

The dyestuffs exhibit good exhaust properties and give deep, brilliant dyeings having good fastnesses, for example fastness to light, ironing, heat, steam, washing, sweat, pleating, decatizing, dry cleaning and cross-dyeing. The dyestuffs reserve wool, have notable pH-stability, combination properties, migration, stability to boiling resistance to hydrolysis, good solubility and high saturation limits and are scarcely affected by electrolytes.

The compounds of formula I are primarily useful for obtaining even dyeings of polyacrylonitrile materials of varying exhaust rates. In dyeing such materials, the compounds of formula I, particularly those having cation molecular weights of 300 or less, show good migration properties and can be dyed without the use of a retarder. If they are dyed in the presence of a retarder it is advantageous if the retarder also has good migration properties. Slow-, normal- or fast-exhaust polyacrylonitrile materials are described for example in German Offenlegungsschrift No. 2,548,009.

The dyes of formula I, in mixture with other cationic dyes, have useful migration properties for di- or trichromic dyeings.

The invention will now be illustrated with reference to the following Examples in which any percentage given is a percentage by weight, any temperature given is in °C. and any parts given are parts by weight.

EXAMPLE 1

The production of the compound of formula IX

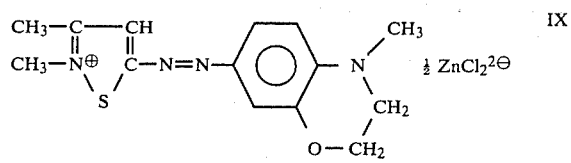

(i) Diazotisation 36.85 Parts of 5-amino-3-methylisothiazole hydrochloride is stirred in a solution of 120 parts phosphoric acid and 80 parts acetic acid. On cooling a clear solution forms and the solution is cooled to 0° C. 88.2 parts of 40% nitrosyl sulphuric acid is added dropwise to the stirred solution over 40 minutes, cooling so that the reaction temperature does not go over 3° C. After the addition the solution is stirred for a further 30 minutes at 0° to 5° C.

(ii) Coupling 36.5 Parts of N-methylbenzomorpholine is dissolved in 300 parts ethanol and 60 parts water. The solution is cooled to 0° C. Under vigorous stirring the above diazonium salt solution is added over 1 hour. At the same time 390 parts of a 30% solution of caustic soda is added dropwise to maintain the pH of the coupling mixture between pH 4 and 5. The dyestuff so obtained can be recovered by filtration from the resulting suspension. After washing with water the dyestuff is dried at 40° C. under vacuum. The pure form of the dyestuff recrystallised from Cellosolve melts in the range 179° to 181° and has formula X

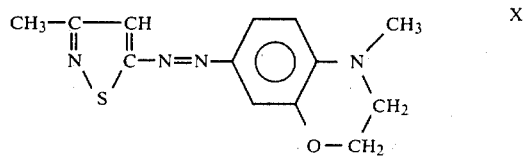

(iii) Quaternisation are listed in the table below, the anion $A^\ominus$ can be any one of those above described.

| Ex. No. | R | $R_1$ | $R_2$ | $R_3$ | $R_5$ | $R_4$ |
|---|---|---|---|---|---|---|
|  |  |  |  | $R_3$ together with $R_5$ |  |  |
| 2 | $-C_2H_5$ | $-CH_3$ | H | $-CH_2-CH_2-O-$ |  | $-CH_3$ |
| 3 | $-CH_3$ | $-CH_3$ | H | " |  | $-C_2H_5$ |
| 4 | " | H | H | " |  | $-CH_3$ |
| 5 | $-CH_2CH=CH_2$ | H | H | " |  | " |
| 6 | $-CH_3$ | H | H | " |  | n-$C_3H_7$ |
| 7 | " | H | H | " |  | $-CH_2-CH=CH_2$ |
| 8 | " | H | $-CH_3$ | " |  | $-CH_3$ |
| 9 | " | $-CH_3$ | H | $-CH-CH_2-O-$<br>\|<br>$CH_3$ |  | " |
| 10 | $-CH_2-CH=CH_2$ | H | H | $-CH-CH_2-O-$<br>\|<br>$CH_3$ |  | " |
| 11 | " | H | H | $-OCH_3$ | $-CH_3$ | " |
| 12 | " | H | H | " | " | $-CH_2CH_2OH$ |
| 13 | " | H | H | $-OC_2H_5$ | H | $-CH_3$ |
| 14 | " | H | H | $-OCH_3$ | $-CH_3$ | H |
| 15 | " | H | H | " | H | H |
| 16 | " | H | H | " | $-C_2H_5$ | H |
| 17 | " | H | H | " | n-$C_3H_7$ | H |

5.5 Parts of the azo dyestuff of formula X, as defined above, is dissolved in 240 parts of dry monochlorobenzene at 70° C. 2.4 parts of dimethyl sulphate in 10 parts of dry monochlorobenzene is added over 30 minutes. The reaction mixture is heated to a temperature in the range 80° to 85° C. and stirred at that temperature range for 4 hours. To remove excess dimethyl sulphate the resultant suspension is heated with 0.25 parts 2-dimethylamino-1-propylamine and further stirred for 1 hour at 80° C. The dyestuff that precipitates from the reaction mixture is then filtered and washed at room temperature with about 100 parts of dried chlorobenzene until the chlorobenzene discharge is colourless. The dyestuff in the form of the methylsulphate salt is hygroscopic and is converted into the non-hygroscopic tetrachlorozinc salt by dissolving the washed dyestuff in 65 parts water and adding 1.6 parts of zinc chloride and 5 parts sodium chloride to precipitate the dyestuff in crystalline form.

The dyestuff is isolated by filtration and is washed with brine and dried. The resultant dyestuff is of the formula

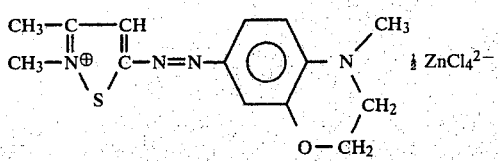

and can be used for dyeing polyacrylonitrile a blue shade. The dyestuff has good steam and light fastness properties on above substrate.

Further dyestuffs of the formula I

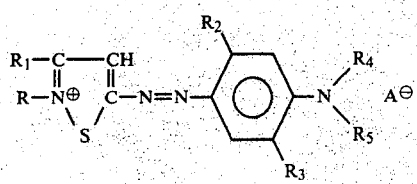

Application Example A

Polyacrylonitrile material is placed into an aqueous bath at 60° C. at a goods to liquor ratio of 1:80, the bath comprising, per liter, 0.125 g glacial acetic acid, 0.375 g of sodium acetate and 0.15 g of the dyestuff of Example 1 (or an equivalent amount of the solid or liquid preparation of the said dyestuff). The bath is then heated for 20 to 30 minutes to boiling and is held at this temperature for a further 90 minutes. After rinsing a blue shade results with good fastness properties.

Application Example B

Acid modified polyester material is placed in an aqueous bath at 20° C. in a goods to liquor ratio of 1:40, the bath comprising, per liter, 3 g of sodium sulphate, 2 g of ammonium sulphate and 2.5 g of a carrier basically being a non-ionic dye assistant with formic acid added to produce a pH of 5.5. The bath is heated to 60° C. and 0.15 g of the dyestuff of Example 1 (or an equivalent amount of a solid or liquid preparation of the said dyestuff) is added and then over about 30 minutes is brought to boiling. The bath is maintained at this temperature for 60 minutes, rinsed and then dried. A blue shade is obtained with good fastness properties.

Application Example C

Acid modified polyester material is placed in an aqueous bath at 20° C. in a goods to liquor ratio of 1:30, the bath comprising, per liter, 6 g of sodium sulphate, 2 g of ammonium sulphate and 0.15 g of the dyestuff of Example 1 (or an equivalent amount of a solid or liquid preparation of the said dyestuff). Sufficient formic acid is added to produce a pH of 5.5 in the bath. The bath is heated in a sealed vessel for 45 minutes to 120° C. and is maintained at this temperature whilst agitating for a further 60 minutes. After rinsing and drying a blue shade is obtained with good fastness properties.

Application Example D

The same procedure is carried out as in Example C except that the bath is heated in a sealed vessel only to 110° C. After rinsing and drying a blue shade is obtained with good fastness properties.

Application Example E

Acid modified polyamide material is placed in an aqueous bath at 20° C. in a goods to liquor ratio of 1:80, the bath comprising, per liter, 3.6 g of calcium dihydrogenphosphate, 0.7 g of disodium phosphate, 1 g of a dyeing assistant, for example the reaction product of a phenol and ethylene oxide, and 0.15 g of the dyestuff of Example 1 (or an equivalent amount of a solid or liquid preparation of the said dyestuff). The bath is heated over 30 minutes to boiling and maintained at this temperature for a further 60 minutes. After rinsing and drying a blue shade is obtained with good fastness properties.

What is claimed is:

1. A compound of the formula $$\begin{array}{c} R_1-C\!-\!\!-\!CH \\ \| \quad\quad \| \\ R-N^\oplus \quad C-N\!=\!N-\!\!\!\!\!\bigcirc\!\!\!\!\!-N\!\!\begin{array}{c}R_4\\R_5\end{array} \\ \diagdown S \diagup \end{array} \quad A^\ominus,$$
(with $R_2$, $R_3$ substituents on ring)

wherein
R is —CH$_3$, —C$_2$H$_5$, —CH$_2$CH$_2$OH, —CH$_2$CH(OH)CH$_3$ or —CH$_2$CH=CH$_2$,
R$_1$ is —H or —CH$_3$,
R$_2$ is —H or —CH$_3$,
R$_3$ is —OCH$_3$ or —OC$_2$H$_5$,
R$_4$ is —H, —CH$_3$, —C$_2$H$_5$, n-C$_3$H$_7$, i-C$_3$H$_7$, —CH$_2$CH$_2$OH or —CH$_2$CH=CH$_2$,
R$_5$ is —H, —CH$_3$, —C$_2$H$_5$, n-C$_3$H$_7$ or i-C$_3$H$_7$ or
R$_3$ and R$_5$ taken together are $$-O-CH_2-\overset{*}{\underset{R_6}{CH}}-,$$

wherein
R$_6$ is —H or —CH$_3$, and
the * indicates the atom attached to the nitrogen atom, and
A$^\ominus$ is an anion.

2. A compound according to claim 1 wherein A$^\ominus$ is a non-chromophoric anion.

3. A compound according to claim 1 having the formula $$\begin{array}{c} R_1-C\!-\!\!-\!CH \\ \| \quad\quad \| \\ R_a-N^\oplus \quad C-N\!=\!N-\!\!\!\!\!\bigcirc\!\!\!\!\!-N\!\!\begin{array}{c}R_{4b}\\R_{5a}\end{array} \\ \diagdown S \diagup \end{array} \quad A^\ominus,$$
(II)
(with R$_3$ on ring)

wherein
R$_a$ is —CH$_3$, —C$_2$H$_5$ or —CH$_2$—CH=CH$_2$,
R$_1$ is —H or —CH$_3$,
R$_3$ is —OCH$_3$ or —OC$_2$H$_5$,
R$_{4b}$ is —H, —CH$_3$ or —C$_2$H$_5$,
R$_{5a}$ is —H, —CH$_3$ or —C$_2$H$_5$ or
R$_3$ and R$_{5a}$ taken together are $$-O-CH_2-\overset{*}{\underset{R_6}{CH}}-,$$

wherein
R$_6$ is —H or —CH$_3$, and
the * indicates the atom attached to the nitrogen atom, and
A$^\ominus$ is an anion.

4. A compound according to claim 3 wherein A$^\ominus$ is a non-chromophoric anion.

5. A compound according to claim 3 having the formula $$\begin{array}{c} R_1-C\!-\!\!-\!CH \\ \| \quad\quad \| \\ CH_3-N^\oplus \quad C-N\!=\!N-\!\!\!\!\!\bigcirc\!\!\!\!\!-N\!\!\begin{array}{c}R_{4b}\\R_{5b}\end{array} \\ \diagdown S \diagup \end{array} \quad A^\ominus,$$
(III)
(with OCH$_3$ on ring)

wherein
R$_1$ is —H or —CH$_3$,
R$_{4b}$ is —H, —CH$_3$ or —C$_2$H$_5$,
R$_{5b}$ is —H or —CH$_3$, and
A$^\ominus$ is an anion.

6. A compound according to claim 3 having the formula $$\begin{array}{c} R_1-C\!-\!\!-\!CH \\ \| \quad\quad \| \\ CH_3-N^\oplus \quad C-N\!=\!N-\!\!\!\!\!\bigcirc\!\!\!\!\!-N\!\!\begin{array}{c}CH_3\\R_6\end{array} \\ \diagdown S \diagup \end{array} \quad A^\ominus,$$
(IV)

wherein
R$_1$ is —H or —CH$_3$,
R$_6$ is —H or CH$_3$, and
A$^\ominus$ is an anion.

7. The compound according to claim 6 having the formula $$\begin{array}{c} CH_3-C\!-\!\!-\!CH \\ \| \quad\quad \| \\ CH_3-N^\oplus \quad C-N\!=\!N-\!\!\!\!\!\bigcirc\!\!\!\!\!-N\!\!\begin{array}{c}CH_3\\H\end{array} \\ \diagdown S \diagup \end{array} \quad \tfrac{1}{2}ZnCl_4^=.$$

8. A compound according to claim 1 having the formula $$\begin{array}{c} R_1-C\!-\!\!-\!CH \\ \| \quad\quad \| \\ R-N^\oplus \quad C-N\!=\!N-\!\!\!\!\!\bigcirc\!\!\!\!\!-N\!\!\begin{array}{c}R_4\\R_6\end{array} \\ \diagdown S \diagup \end{array} \quad A^\ominus,$$
(with R$_2$ on ring)

wherein

R is —CH₃, —C₂H₅, —CH₂CH₂OH, —CH₂CH(OH)CH₃ or —CH₂CH=CH₂,

R₁ is —H or —CH₃,

R₂ is —H or —CH₃,

R₄ is —H, —CH₃, —C₂H₅, n-C₃H₇, i-C₃H₇, —CH₂CH₂OH or —CH₂CH=CH₂,

R₆ is —H or —CH₃, and

A⊖ is an anion.

9. A compound according to claim 8 having the formula

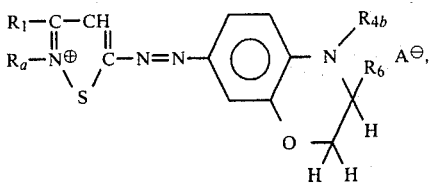

wherein
Rₐ is —CH₃, —C₂H₅ or —CH₂—CH=CH₂,
R₁ is —H or —CH₃,
R₄ᵦ is —H, —CH₃ or —C₂H₅,
R₆ is —H or —CH₃, and
A⊖ is an anion.

10. A process for the dyeing or printing of a cationically dyeable substrate comprising applying to the substrate a compound according to claim 1.

11. Cationically dyeable substrate dyed with a compound according to claim 1.

12. Polyacrylonitrile dyestuff dyed with a dyestuff compound according to claim 1.

* * * * *